United States Patent [19]

Matsuda et al.

[11] Patent Number: 4,669,333

[45] Date of Patent: Jun. 2, 1987

[54] PLANETARY GEAR MECHANISM

[75] Inventors: Kiyoshi Matsuda; Minoru Mizutani, both of Tokyo, Japan

[73] Assignee: Oki Electric Industry Co. Ltd., Tokyo, Japan

[21] Appl. No.: 758,274

[22] Filed: Jul. 24, 1985

[30] Foreign Application Priority Data

Jul. 27, 1984 [JP] Japan .................................. 59-155497

[51] Int. Cl.$^4$ .............................................. F16H 35/00
[52] U.S. Cl. ........................................ 74/810; 74/384; 74/812
[58] Field of Search ........................... 74/384, 810, 812

[56] References Cited

U.S. PATENT DOCUMENTS

| | | | |
|---|---|---|---|
| 1,710,631 | 4/1929 | Loram | 74/812 |
| 1,736,064 | 11/1929 | Walker | 74/812 |
| 2,506,562 | 5/1950 | Wait | 74/812 X |
| 2,552,288 | 5/1951 | Lee | 74/812 X |
| 3,168,840 | 2/1965 | Williams | 74/810 X |
| 3,323,391 | 6/1967 | Chin et al. | 74/812 |
| 4,137,789 | 2/1978 | Herleth | 74/810 X |
| 4,422,263 | 12/1983 | Masubuchi | 74/384 X |

FOREIGN PATENT DOCUMENTS

| | | | |
|---|---|---|---|
| 2901087 | 7/1979 | Fed. Rep. of Germany | 74/810 |
| 200845 | 11/1983 | Japan | 74/810 |
| 229883 | 2/1944 | Switzerland | 74/812 |

Primary Examiner—Rodney H. Bonck
Assistant Examiner—Dwight G. Diehl
Attorney, Agent, or Firm—Wenderoth, Lind & Ponack

[57] ABSTRACT

A gear mechanism includes a pair of drive transmission gears laterally movably disposed between a base plate and a housing provided on the base plate, and a control structure for restricting the lateral movement of the drive transmission gears. Turning force from a single driving gear is transmitted to the drive transmission gears, movements of which are controlled by the control structure. In the different embodiments, the controlled turning forces of the drive transmission gears can be transmitted to either or both of the driven gears.

17 Claims, 4 Drawing Figures

PLANETARY GEAR MECHANISM

BACKGROUND OF THE INVENTION

1. Field of the Invention

The present invention relates to a gear mechanism for allowing a pair of driven gears to be rotated in an arbitrary direction by a single driving gear rotating clockwise or counterclockwise.

More particularly, the present invention relates to a gear mechanism in which one of the pair of the driven gears, for example, a right-side driven gear, is always rotated counterclockwise and a left-side driven gear is always rotated reversely by the single driving gear rotating clockwise or reversely.

2. Description of the Related Art

In a known gear mechanism having first and second intermediate or drive transmission gears ("intermediate gears") and left-side and right-side driven gears the intermediate gears are rotatably mounted on opposite ends of a lever which is rotatable on its central part as a rotating shaft.

The first intermediate gear is engaged with a single driving gear as well as with the second intermediate gear.

Clockwise rotation of the driving gear causes the lever to be rotated due to a turning force thereof. Consequently, the first intermediate gear is engaged with the left-side driven gear to cause the latter to be rotated clockwise.

By contrast, the second intermediate gear is engaged with the right-side driven gear to cause the latter to be rotated counterclockwise.

Then, counterclockwise rotation of the driving gear causes the lever to be reversely rotated due to the turning force thereof. Consequently, the first intermediate gear is engaged with the right-side driven gear to cause the latter to be rotated counterclockwise. By contrast, the second intermediate gear is engaged with the left-side intermediate gear to cause the latter to be rotated clockwise.

In order to rotate the lever by forward/backward rotation of the driving gear, it is necessary to apply a slight tension to the second intermediate gear employing a bias spring.

Namely, the bias spring is arranged to apply tension to the tooth face of the second intermediate gear in the direction of the first intermediate gear.

As described above, the turning force of the driving gear produced due to clockwise/anticlockwise rotation thereof causes the left-side driven gear to be always rotated clockwise as well as the right-side driven gear to be always rotated counterclockwise.

Such a prior gear mechanism suffers from the following difficulties:

(1) Backlash between the driving gear and the first intermediate gear is increased following the rotation of the lever and becomes a maximum when main power is transmitted, or the first intermediate gear is engaged with the right-side or left-side driven gear.

(2) Since both of the intermediate gears are moved integrally with the lever, so that if the dimensional accuracy of the system is not ideal, engagement of either one of the intermediate gears with the driven gear causes the rotation of the lever to be stopped, resulting in backlash between the other intermediate gear and the driven gear.

(3) Integral movement of the intermediate gears with the lever causes turning force to be transmitted simultaneously to the driven gears. Accordingly, any load applied to the driven gears is rapidly increased.

(4) In addition, the intermediate gears are integrally mounted in the lever, so that no intermittent operation is made possible wherein a turning force of the driving gear is transmitted only to one of the driven gears.

SUMMARY OF THE INVENTION

It is an object of the present invention to solve the above-described problems. Another object of the present invention is to improve reliability as well as do simplify the construction.

According to the present invention, there is provided a housing, a base plate on which said housing is mounted, two drive transmission (hereinafter "intermediate") gears movably disposed between said housing and the base plate, and a restriction means for restricting movements of the respective intermediate gears.

According to the features of the present invention described above, the turning force of a driving gear is transmitted to the movably held intermediate gears, movements of the intermediate gears are controlled by a control means, and the turning force of the intermediate gears is transmitted to either of two driven gears as needed.

The above and other objects, features and advantages of the present invention will become more apparent from the following description when taken in conjunction with the accompanying drawings in which preferred embodiment of the present invention are shown by way of illustrative example.

DETAILED DESCRIPTION OF THE PREFERRED EMBODIMENTS

Figure 2:
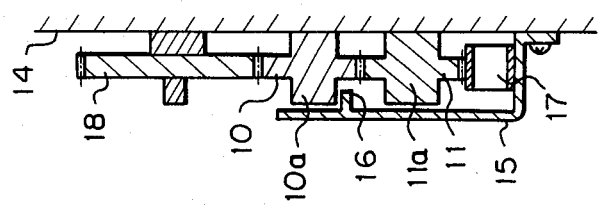
FIG. 2 is a cross sectional view along a line II—II of FIG. 1.
Figure 1:
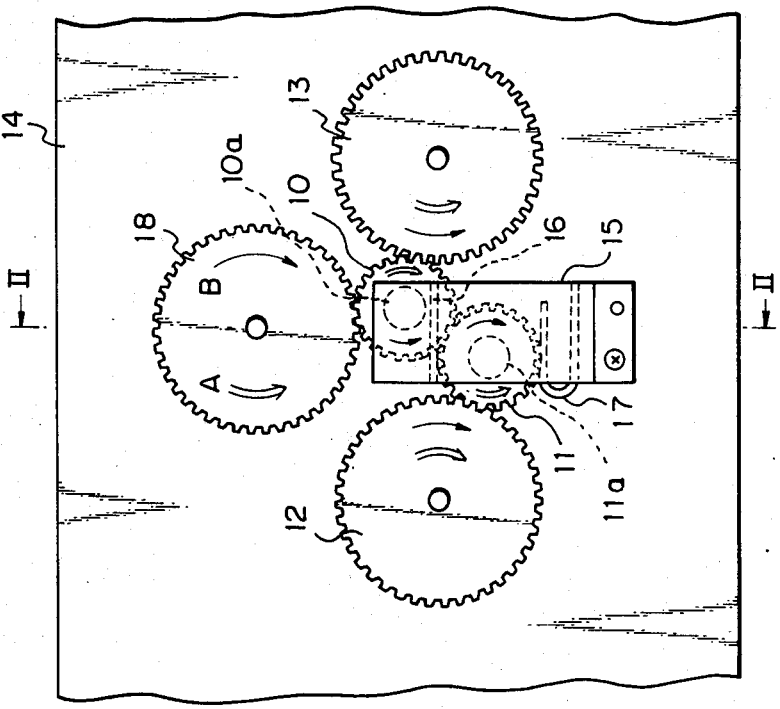
FIG. 1 is a plan view illustrating a first embodiment according the present invention.

A first embodiment according to the present invention will be described below with reference to FIGS. 1 and, 2.

The first embodiment includes two drive transmission gears (hereinafter intermediate gears) 10, 11 engaged with each other and respectively including flange parts 10a, 11a formed around central portions thereof, driven gears 12, 13 rotatably mounted on a base plate 14 on respective opposite sides of the intermediate gears 10, 11, and a housing 15 including a guide rib 16 providing a control means for controlling or guiding movements of the intermediate gears 10, 11. Guide rib 16 projects inward thereof. Housing 15 is mounted on the base plate 14. The housing movably holds the intermediate gears 10, 11 in a sandwiching relation in association with the base plate 14 so that the intermediate gears 10, 11 are both laterally movable between the base plate 14 and the housing 15. The guide rib 16 is provided between the intermediate gears 10, 11, and extends in the direction of the driven gears 12, 13 disposed on both sides of the intermediate gears, serving as a horizontal guide rib for guiding the intermediate gears. Designated at 18 is a driving gear rotatably mounted on the base plate 14. Fine backlash is provided between the flange part 10a of the intermediate gear 10 and the horizontal guide rib 16 such that the intermediate gear 10 is movably pressed on to the driving gear 18. Designated at 17 is a bias spring for applying a slight tension to the tooth face of the intermediate gear 11 in the direction of the driving gear 18.

Operation of the above-described construction will be described below. First, counterclockwise rotation (in the direction of arrow A in FIG. 1) of the driving gear 18 causes the intermediate gear 10 to be moved toward the driven gear 13 by guidance of the guide rib 16 to be engaged with the driven gear 13 and thereby to be rotated clockwise. Thus, the driven gear 13 is rotated counterclockwise due to the turning force of the intermediate gear 10.

By contrast, the clockwise turning force of the intermediate gear 10 causes the intermediate gear 11 to be moved in the direction of the driven gear 12 for its engagement with this driven gear 12 and thereby to be rotated counterclockwise. Thus, the driven gear 12 is rotated clockwise due to the turning force of the intermediate gear 11. It should be noted that during the above-described operation, no backlash is produced among the driving gear 18, intermediate gears 10, 11, and driven gears 12, 13.

Successively, clockwise rotation of the driving gear 18 (in the direction of arrow B in FIG. 1) causes the intermediate gear 10 to be subject to force in the direction of the driven gear 12. However, the intermediate gear 11 is not rotated due to frictional force of the bias spring 17. Accordingly, only the intermediate gear 10 moves in the direction of the driven gear 12 and is engaged with it. It should be noted here that when the intermediate gear 10 is disengaged from the driven gear 13 under large turning load of the driven gear 13 in a state shown in FIG. 1, the intermediate gear 10 is subject to force directed left and downward in FIG. 1 taking as a center a point on respective pitch circles of the intermediate gear 10 and the driven gear 13 at which they are engaged with each other. This may cause a gear mechanism to no longer hold good due to the disengagement of the driving gear 18 from the intermediate gear 10 and vice versa if they are left behind as they are, so that the force directed left and down is converted to that in the direction of the driven gear 12 with the aid of the horizontal guide rib 16 of the housing 15. When the intermediate gear 10 starts to be rotated counterclockwise due to the engagement between the driven gear 12 and the intermediate gear 10, the driven gear 12 is rotated clockwise. Simultaneously, the intermediate gear 11 is subject to force directed toward the driven gear 13 due to counterclockwise turning force of the intermediate gear 10. The intermediate gear 11 accordingly overcomes weak frictional force between it and the bias spring 17 due to the just-described force and moves in the direction of the driven gear 13 to be engaged with the driven gear 13. Thus, with starting of clockwise rotation of the intermediate gear 11, the driven gear 13 is rotated counterclockwise. Here, also during the above-described operation, no backlash is produced among the driving gear 18, intermediate gears 10, 11, and driven gears 12, 13.

Figure 3:
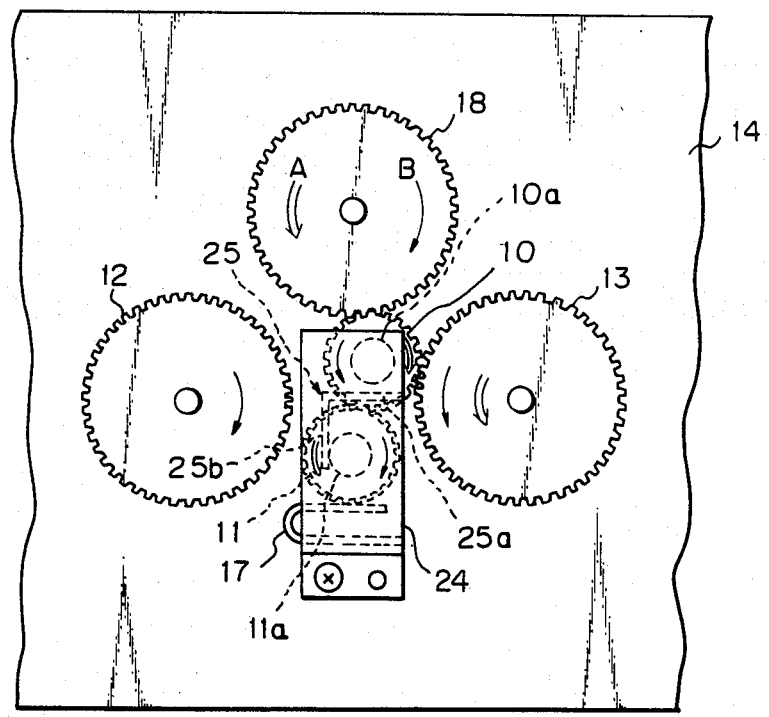
FIG. 3 is a plan view showing a second embodiment according to the present invention.

FIG. 3 is a plan view illustrating a second embodiment according to the present invention. This second embodiment is constituted such that the driven gear 12 is made stationary only when the driving gear 18 rotates counterclockwise by changing the shape of the horizontal guide rib 16 of the housing shown in the first embodiment. Further, the same numerals shall be applied to the same parts as in the first embodiment and description of these parts omitted.

Designated at 24 in FIG. 3 is a housing, which includes, on the internal surface thereof, a guide rib 25, or a control means for controlling movements of the intermediate gears 10, 11 allowed to project and mounted on the base plate 14. The guide rib 25 is composed of a horizontal guide part 25a extending toward driven gears 12, 13 located on both sides of the housing and of a stopper part 25b formed perpendicularly to the horizontal guide part 25a on the end part thereof on the driven gear 12 side. The housing movably holds the intermediate gears 10, 11 in a sandwiching relation in association with the base plate 14. Further, fine backlash is provided between a flange part 10a of the intermediate gear 10 and the guide rib 25 to permit the intermediate gear 10 to move toward the respective driven gears 12, 13 when it is pushed by the driving gear.

Operation of the above described construction will be described below. First, counterclockwise (in the direction of arrow A in FIG. 3) rotation of the driving gear 18 causes the intermediate gear 10 to move toward the driven gear 13 by guidance of the guide rib 25 for its engagement with the driven gear 13, and thereby to be rotated clockwise. The driven gear 13 is accordingly rotated counterclockwise due to this turning force.

By contrast, the intermediate gear 11 moves toward the driven gear 12 due to the turning force of the intermediate gear 10, and the flange part 11a thereof makes close contact with the stopper part 25b of the guide rib 25, but the intermediate gear 11 rotates idly counterclockwise. Consequently, the driven gear 12 remains stationary because of the disengagement between it and the planetary gear 10.

Successively, clockwise (in the direction of arrow B in FIG. 3) rotation of the driving gear 18 results in the same operation as in the above-described embodiment. Namely, only the intermediate gear 10 moves due to clockwise turning force of the driving gear 18 in the direction of the driven gear 12 by guidance of the horizontal guide rib 25 and is engaged with the driven gear 12. When the intermediate gear 10 starts to be rotated counterclockwise, the driven gear 12 is rotated clockwise. Simultaneously, counterclockwise turning force of the intermediate gear 10 causes the intermediate gear 11 to move in the direction of the driven gear 13 and to be engaged with the driven gear 13. When the intermediate gear 11 starts to be rotated clockwise, the driven gear 13 is rotated counterclockwise.

Figure 4:
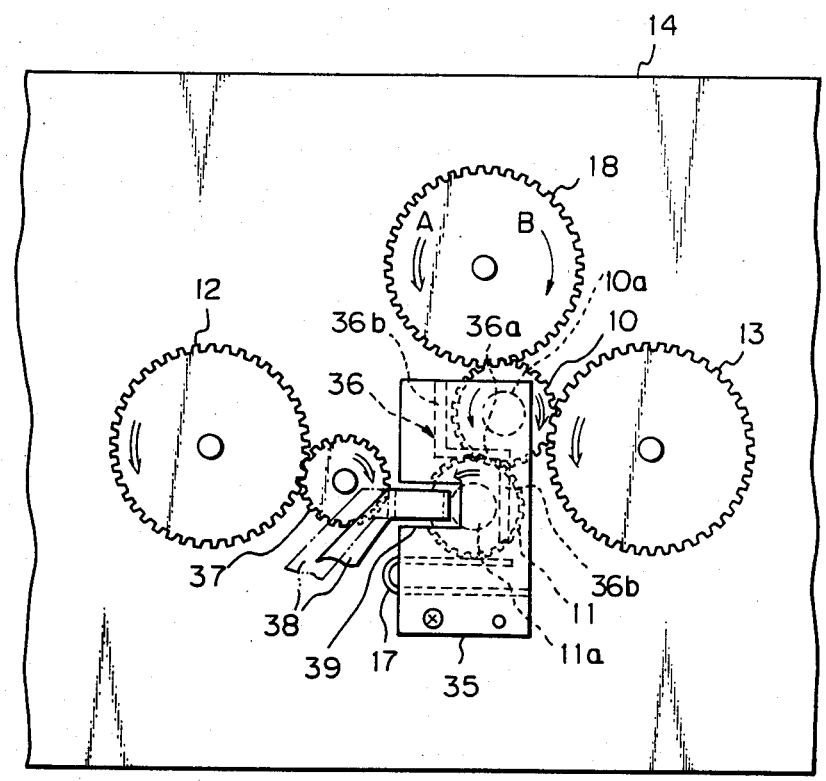
FIG. 4 is a plan view of a third embodiment according to the present invention.

FIG. 4 is a plan view illustrating a third embodiment according to the present invention. In this embodiment, counterclockwise rotation of the driving gear causes both the driven gears to be rotated counterclockwise, while clockwise rotation of the driving gear does not cause rotation of the driven gears. Accordingly, the shapes of the guide rib and the housing are changed, and an idle gear and a control lever are provided.

In the figure, the same numerals are applied to the same portions as the first and second embodiments, and description of these portions is omitted.

Designated at 35 is a housing, which includes, inside it, a guide rib 36 projecting therefrom as a restriction means for restricting movements of the intermediate gears 10, 11 and a cutaway portion 39 formed in a center side part thereof. Housing 35 is mounted on the base plate 14. The intermediate gears 10, 11 are movably held in a sandwiching relation between the housing 35 and the base plate 14. The guide rib 36 is composed of a horizontal guide rib 36a and a stopper part 36b. The horizontal rib 36a is provided between the intermediate gears 10, 11, and extends toward the driven gears 12, 13 located on both sides of the intermediate gears for guiding them. The stopper part 36b is formed perpendicularly to the horizontal guide rib 36a at both ends thereof. Fine backlash is provided between the flange part 10a of the intermediate gear 10 and the above-described guide rib 36a to permit the intermediate gear 10 to be movably pressed by the driving gear 18. Designated at 37 is an idle gear, which is disposed between the intermediate gear 11 and the driven gear 12 to be engaged with them, and movably mounted on the base plate 14 rightward for movement between leftward as shown in FIG. 4. Designated at 38 is a control lever, the tip part of which is disposed in the cutaway portion of the housing 35 or pressing and moving the flange part 11a of the intermediate gear 11 as required. Designated at 17 is a bias spring, which serves to apply slight tension to the tooth face of the intermediate gear 11 toward the driving gear 18.

Operation of the above-described construction will be described below. First, with the control lever 38 located at the leftward position shown in phantom line in FIG. 4, counterclockwise (in the direction of arrow A in FIG. 1) rotation of the driving gear 18 causes the intermediate gear 10 to be moved toward the driven gear 13 by guidance of the horizontal guide part 36a of the guide rib 36 for engagement therewith and thereby to be rotated clockwise, resulting in the driven gear 13 being rotated counterclockwise due to this turning force.

By contrast, the intermediate gear 11 moves in the direction of the idle gear 37 due to the above-described turning force of the intermediate gear 10. Although shown in FIG. 4 is a state in which the intermediate gear 11 and the idle gear 37 are not engaged with each other, the intermediate gear 11 can move leftward to be engaged with the idle gear 37 the since pressing force applied to the control lever has been released, and rotated counterclockwise. Accordingly, the idle gear 37 is rotated clockwise by the engaging counterclockwise rotating intermediate gear due to the turning force just-described above, and thereby the driven gear 12 is rotated counterclockwise.

At this instance, if the flange part 11a of the intermediate gear 11 is pressed and moved toward the driven gear 13 by operation of the control lever 38 as required, then the intermediate gear 11 and the idle gear 37 are disengaged to permit the idle gear 12 and the driven gear 37 to be stopped while the intermediate gear 11 to be permitted do rotate idly. If the control lever 38 is again returned to a position shown by the phantom line in FIG. 4, or the pressing force applied to the intermediate gear 11 is released, then the intermediate gear 11 is moved in the direction of the idle gear 37 due to frictional force of the bias spring 17 and the turning force of the intermediate gear 10 for its engagement with the idle gear 37, causing the idle gear 37 and the driven gear 12 to be both rotated.

Successively, clockwise (in the direction of arrow B in FIG. 4) rotation of driving gear 18 causes the intermediate gear 10 to be moved in the direction of the driven gear 12 by guidance of the horizontal guide part 36a of the guide rib 36, and to make close contact with the stopper 36b. Accordingly, the intermediate gear 10 is rotated idly counterclockwise. The intermediate gear 11 makes close contact with the stopper part 36b of the guide rib 36 due to this turning force and is allowed to be rotated idly.

Namely, in this embodiment, counterclockwise (in the direction of arrow A) rotation of the driving gear 18 causes, as described above, the driven gears 12, 13 to be rotated counterclockwise. If the intermediate gear 11 is pressed at this time by the lever 38 as required it is then possible to stop the rotation of the driven gear 12. In addition, if the driven gear 18 is rotated clockwise (in the direction of arrow B), then the intermediate gears 10, 11 are rotated idly, resulting in the driven gears not being rotated.

According to the present invention:

(1) No backlash is produced among a train of gears upon power transmission since an intermediate gear is not connected with a lever, unlike a conventional gear mechanism.

(2) Since there is no backlash, power transmission at a proper pressure angle is made possible. In addition, reliable operation can be achieved toward with providing great large freedom in designing a train of intermediate gears. Namely, if a direction of the pressure angle when gears are engaged with each other lies in a direction where the gears are engaged with each other, it is not required to design the gear mechanism symmetrically to the right and left, enabling the degrees of freedom in its design and manufacture to be expanded.

(3) By movement of intermediate gears, an intermediate gear on the driving gear side is first changed over and then the other intermediate gear is changed over. Since power transmission is effected stepwise in such a manner, no rapid load variation is produced on the driving gear.

(4) Such intermediate gears can be independently moved, so that it is possible to individually control them by means of a guide rib or a control lever as well as intermittently transmit power.

(5) There is no need to employ rotating parts, e.g., a prior lever or the like, so that construction of a gear mechanism can be simplified and its reliability improved. In addition, it is possible to use the gear mechanism according to the present invention for a ribbon winding mechanism of a printer, etc.

What is claimed is:

1. A planetary gear mechanism, comprising:
   first and second intermediate gears;
   a driving gear, rotatable clockwise and counterclockwise;
   a first driven gear and a second driven gear laterally spaced from each other and rotated by the turning force of said driving gear via said intermediate gears;
   a base plate, the driving gear and the driven gears being rotatably mounted on said base plate;
   a housing fixably mounted on said base plate;
   said first and second intermediate gears being engaged with each other and being respectively engageable with said first and second driven gears;
   said first and second intermediate gears being laterally movably disposed between said housing and said base plate; and
   a restriction means for restricting movements of said first and second intermediate gears, said restriction means including a guide rib between said housing and said base plates and between said first and second driven gears, extending laterally between said first and second intermediate gears in a direction from said first driven gear toward said second driven gear.

2. A gear mechanism according to claim 1, wherein a bias spring is provided on the base plate for applying tension to said second intermediate gear, said driving gear engaging said first intermediate gear.

3. A gear mechanism according to claim 1 wherein said guide rib includes a first guide rib part extending in said direction, located between said first and second intermediate gears, and a second stopper part provided perpendicularly to said first guide rib part for restricting the movement of one of said first and second intermediate gears so as to block said one of said first and second intermediate gears from engagement with one of said first and second driven gears.

4. A gear mechanism, comprising:
 a base plate;
 a housing fixedly mounted on said base plate;
 a driving gear rotatably mounted on said base plate for clockwise and counterclockwise rotation;
 a first driven gear laterally spaced from said driving gear, and a second driven gear laterally spaced from said driving gear and said first driven gear, each rotatably mounted on said base plate;
 a first intermediate gear operatively engaging said driving gear, and a second intermediate gear operatively engaging said first intermediate gear, each of said first and second imtermediate gears being laterally movably disposed between said housing and said base plate; and
 means, responsive to rotation of said driving gear, for reversibly guiding said first intermediate gear in first lateral movement from a first position spaced from said first driven gear to a second position in operative engagement with said first driven gear such that rotation of said driven gear rotates said first driven gear through said first, intermediate gear, and for reversibly guiding said second intermediate gear in second lateral movement from a third position spaced from said second driven gear to a fourth position in operative engagement with said second driven gear such that rotation of said driving gear rotates said second driven gear through said first and second intermediate gears and so as to bring said first and second intermediate gears into contemporaneous engagement with respective ones of said first and second driven gears.

5. A gear mechanism as in claim 4, wherein said guiding means comprises means, responsive to a rotative force applied to said second intermediate gear by said first intermediate gear upon operative engagement by said first intermediate gear with said first driven gear upon said first lateral movement of said first intermediate gear to said first position, for urging said second intermediate gear in lateral movement from said third position into operative engagement with said second driven gear after said first intermediate gear is in operative engagement with said first driven gear.

6. A gear mechanism as in claim 5, wherein said urging means includes an elastic member engaging said second intermediate gear so as to bias said second intermediate gear toward said fourth position and into operative engagement with said second driven gear when said second intermediate gear is immediately adjacent thereto and toward said third position when said second intermediate gear is immediately adjacent thereto.

7. A gear mechanism as in claim 4, further comprising an elastic member engaging said second intermediate gear so as to bias said second intermediate gear toward said fourth position and into operative engagement with said second intermediate gear when said second intermediate gear is immediately adjacent thereto and toward said third position when said second intermediate gear is immediately adjacent thereto.

8. A gear mechanism as in claim 4, wherein said guiding means includes a guide rib fixedly disposed between said housing and said base plate.

9. A gear mechanism as in claim 4, wherein said guiding means includes a guide rib fixedly disposed between said housing and said base plate, said guide rib extending laterally between said first and second intermediate gears in a direction from said first driven gear toward said second driven gear.

10. A gear mechanism as in claim 9, wherein said guiding means includes a control lever engagable with said second intermediate gear for pressing said second intermediate gear to control the lateral movement thereof.

11. A gear mechanism as in claim 9, wherein said guide rib includes a guide rib part extending in said direction, and a stopper part formed perpendicularly to said direction for restricting the movement of each of said first and second intermediate gears such that said first intermediate gear is blocked from engagement with said second driven gear and said second intermediate gear is blocked from engagement with said first driven gear.

12. A gear mechanism as in claim 4, wherein said first position is located such that said first intermediate gear is in operative engagement with said second driven gear when in said first position.

13. A gear mechanism as in claim 12, wherein said third position is located such that said second intermediate gear is in operative engagement with said first driven gear when in said third position.

14. A gear mechanism as in claim 14, wherein said third position is located such that said second intermediate gear is in operative engagement with said first driven gear when in said third position.

15. A gear mechanism as in claim 4, wherein said reversibly guiding means is responsive to rotation of said driving gear clockwise to guide said first intermediate gear in said first lateral movement from said first position to said second position in operative engagement with said first driven gear such that clockwise rotation of said driving gear rotates said first driven gear through said first intermediate gear, and to guide said second intermediate gear in second lateral movement from said third position to said fourth position in operative engagement with said second driven gear such that clockwise rotation of said driving gear rotates said second driven gear through said first and second intermediate gears and so as to bring said first and second intermediate gears into contemporaneous engagement with respective ones of said first and second driven gears, and said guiding means is also responsive to counterclockwise rotation of said driving gear to guide said first intermediate gear in third lateral movement from said second position to said first position and to guide said second intermediate gear in fourth lateral movement from said fourth position to said third position.

16. A planetary mechanism, comprising:
 first and second intermediate gears;

a driving gear rotatable clockwise and counterclockwise;

a first driven gear and a second driven gear laterally spaced from each other and rotated by the turning force of said driving gear via said intermediate gears;

a base plate, the driving gear and the driven gears being rotatably mounted on said base plate;

a housing fixedly mounted on said base plate;

said first and second intermediate gears being engaged with each other and being respectively engageable with said first and second driven gears, said first intermediate gear being engaged with said driving gear;

said first and second intermediate gears being laterally movably disposed between said housing and said base plate; and a restriction means for restricting movements of said first and second intermediate gears, said restriction means including a guide rib between said housing and said base plate, and a control lever engagable with said second intermediate gear for pressing said second intermediate gear to control the lateral movement thereof.

17. A planetary gear mechanism according to claim 16 wherein said guide rib includes a first guide rib part located between said first and second intermediate gears and between said first and second drive gears, and extending in a direction from said first driven gear toward said second driven gear, and a stopper part provided perpendicularly to said first guide rib part for restricting the movement of each of said first and second intermediate gears such that said first and second intermediate gears are respectively blocked from engagement with said second and first driven gears.

* * * * *